United States Patent
Clegg et al.

(10) Patent No.: US 7,624,223 B2
(45) Date of Patent: Nov. 24, 2009

(54) APPARATUS AND METHODS FOR MULTIPLE UNIDIRECTIONAL VIRTUAL CONNECTIONS AMONG SAS DEVICES

(75) Inventors: Roger T. Clegg, Wichita, KS (US); Brian Day, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 213 days.

(21) Appl. No.: 11/682,798

(22) Filed: Mar. 6, 2007

(65) Prior Publication Data
US 2008/0162773 A1   Jul. 3, 2008

Related U.S. Application Data

(60) Provisional application No. 60/882,847, filed on Dec. 29, 2006.

(51) Int. Cl.
*H04J 3/00* (2006.01)
(52) U.S. Cl. .................. 710/316; 370/280
(58) Field of Classification Search ........... 710/316; 370/280
See application file for complete search history.

(56) References Cited

U.S. PATENT DOCUMENTS

| | | | | |
|---|---|---|---|---|
| 7,155,546 B2 * | 12/2006 | Seto | ............ | 710/100 |
| 7,206,875 B2 * | 4/2007 | Marushak et al. | ............ | 710/62 |
| 7,269,674 B2 * | 9/2007 | Chikusa et al. | ............ | 710/74 |
| 7,340,551 B2 * | 3/2008 | Elliott et al. | ............ | 710/309 |
| 7,356,728 B2 * | 4/2008 | Tawil et al. | ............ | 714/5 |
| 7,377,800 B2 * | 5/2008 | Gasser | ............ | 439/374 |
| 7,451,255 B2 * | 11/2008 | Gustafson et al. | ............ | 710/62 |
| 7,457,902 B2 * | 11/2008 | Yang et al. | ............ | 710/200 |
| 2005/0210159 A1 | 9/2005 | Voorhees et al. | | |
| 2005/0228924 A1 | 10/2005 | Marushak et al. | | |
| 2006/0080671 A1 | 4/2006 | Day et al. | | |
| 2006/0101171 A1 * | 5/2006 | Grieff et al. | ............ | 710/36 |
| 2006/0242312 A1 * | 10/2006 | Crespi et al. | ............ | 709/230 |
| 2007/0005833 A1 * | 1/2007 | Seto | ............ | 710/52 |
| 2007/0088917 A1 * | 4/2007 | Ranaweera et al. | ............ | 711/148 |
| 2007/0220204 A1 * | 9/2007 | Nakajima et al. | ............ | 711/114 |
| 2007/0226757 A1 * | 9/2007 | Bashford et al. | ............ | 719/326 |
| 2008/0005470 A1 * | 1/2008 | Davies | ............ | 711/114 |
| 2008/0091810 A1 * | 4/2008 | Blinick et al. | ............ | 709/223 |

OTHER PUBLICATIONS

Working Draft American National Standard Project 110/1601-D Information technology—Serial Attached SCSI-1.1 (SAS-1.1) Revision 4, Mar. 13, 2004.*
Chow, I. "SAS Expander FPGA Emulation", Simon Frasier University Thesis, Fall 2005, Burnaby, BC, Canada.

* cited by examiner

*Primary Examiner*—Paul R Myers
(74) *Attorney, Agent, or Firm*—Duft Bornsen & Fishman LLP

(57) ABSTRACT

Apparatus and methods for enabling multiple, unidirectional, virtual connections between a first SAS device and multiple other SAS devices in a SAS domain. An enhanced first SAS device may be substantially simultaneously coupled to each of two other SAS devices through one or more appropriately enhanced SAS expanders to allow substantially simultaneous unidirectional virtual connections from the first SAS device to both of the second and third SAS devices. Each virtual connection is, in essence, a half-duplex connection such that the first device is transmitting information to a second SAS device substantially simultaneous with the first device receiving information from a third SAS device. The enhancements are provided in a manner to allow backward compatibility with current SAS specifications for connectivity among devices not suitably enhanced in accordance with features and aspects hereof (e.g., with legacy devices).

20 Claims, 6 Drawing Sheets

APPARATUS AND METHODS FOR MULTIPLE UNIDIRECTIONAL VIRTUAL CONNECTIONS AMONG SAS DEVICES

RELATED PATENT APPLICATIONS

This patent application is related to and claims priority to U.S. Provisional Patent Application Ser. No. 60/882,847 filed 29 Dec. 2006 and entitled: Apparatus and Methods for Multiple Unidirectional Virtual Connections Among SAS Devices.

BACKGROUND

1. Field of the Invention

The invention relates generally to SAS domains and more specifically relates to apparatus, systems, and methods for multiple unidirectional virtual connections between SAS devices in a SAS domain.

2. Discussion of Related Art

Serial Attached SCSI ("SAS") is a popular protocol and medium for connecting the components of a networked storage/computing architecture. In general, SAS standards define a SAS domain as including one or more SAS initiators coupled to one or more SAS target devices zero or more SAS expander devices. In general, a SAS initiator device is coupled to a SAS target device as a point to point connection. To enhance flexibility in connecting a SAS initiator device to other SAS target devices, a SAS domain may include one or more SAS expanders to provide, in essence, a switched fabric for coupling any of the SAS initiators in a point to point connection to any of the SAS target devices of the SAS domain.

More generally SAS initiators and SAS target device may each be referred to as a SAS end device (or endpoint device) in that many devices may act in the role of an initiator at times and may act in the role of a target at time. Regardless of the role of a device as a SAS initiator or as a SAS target, any SAS compliant device may attempt to open a connection with another device. It is common, for example, for a host bus adapter SAS initiator device to open a connection to a SAS storage target device. However, the storage device may later open a connection back to a requesting host adapter for purposes of returning requested read data. Thus the terms "initiator" and "target" are generally avoided in this discussion. Both initiator and target devices in a connection may simply be referred to herein as an "end device" or as an "endpoint device" or even more simply as a "device". An end device that attempts to open a connection to another end device may also be referred to herein as "opener" or "opening device" while the device that accepts the open request may be referred to as a "opened device".

The SAS standards provide for a full duplex connection between two connected SAS devices. In principle, such a full duplex connection allows the opening device to transmit frames of information (e.g., "data frames") to the opened device substantially in parallel with the opened device transmitting information back to the opener. In accordance with these SAS specifications, such a full duplex connection allows for near full utilization of the point to point connection between the two end devices (some available bandwidth is always consumed by overhead exchanges associated with the protocols). This and other related SAS specifications are well known to those of ordinary skill in the art and are also readily available at, for example, www.t10.org.

In practice it is rare that the connected SAS devices (such as a single disk drive device coupled to an I/O request controller) both have data ready to be transmitted to the other device of an open connection. Even in the context of a SAS host adapter device coupled to a RAID storage subsystem SAS device (depending on the architecture of the RAID storage controller) it may be rare for the host and storage system to fully utilize the available bandwidth of a true full duplex connection. Thus, full (or nearly full) utilization of a SAS connection through true full duplex communication is rare to nonexistent in practice. Rather, empirical test data has shown that the utilization of a SAS connection between two devices tends to be less than 50% of the available communication bandwidth. One aspect of such under-utilization derives from inherent overhead and delays associated with the SAS protocols. However, the most significant contributor to such under-utilization is the underlying communication being performed such that a host system (e.g., a SAS initiator) transmits its one or more frames representing a request to be completed by a storage device (e.g., a single disk drive or a more complex RAID or other arrayed storage device). The storage device typically requires some substantial processing time to complete the request received from the host system. Thus, the SAS target device (e.g., the storage device) rarely has data ready for transmission to the SAS initiator at the same time that the SAS initiator has opened a connection for its transmission of a request. Therefore, an open connection is typically closed upon completion of a transmission from the initiator to the target only to be reconnected when the target device is ready to transmit the requested data back to the initiator.

It is evident from the above discussion that an ongoing need exists to improve bandwidth utilization between SAS initiator devices and SAS target devices in a SAS domain.

SUMMARY

The present invention solves the above and other problems, thereby enhancing the state of the useful arts, by providing apparatus, systems, and associated methods for multiple, unidirectional, virtual connections operable substantially simultaneously between a first SAS device and two other SAS devices. Each of the unidirectional virtual connections is, in essence, a half-duplex connection such that the first device may be transmitting to a second SAS device while it may receive from a third SAS device. This enhanced mode of operation remains backward compatible with existing SAS protocols while allowing enhanced operation with a suitably enabled first SAS device coupled through an appropriately enabled SAS expander to each of the multiple other SAS devices.

One aspect hereof provides a system that includes three SAS devices including a first SAS device, a second SAS device and a third SAS device each coupled to a SAS expander component configured to couple the first SAS device to each of the second SAS device and the third SAS device. The first SAS device and the SAS expander are adapted to simultaneously allow a first open connection between the first and second SAS devices and a second open connection between the first and third SAS devices. The first and second open connections utilize a single link coupling the first SAS device to the SAS expander.

Another aspect hereof provides a method operable in a SAS domain having a SAS expander coupling a first SAS device to each of second and third SAS devices. The method includes establishing a first virtual connection between the first SAS device and the second SAS device through the SAS expander. The first virtual connection is established by the first SAS device and is used to transmit frames from the first SAS device to the second SAS device. The method also includes establishing a second virtual connection between the first SAS device and the third SAS device through the SAS expander. The second virtual connection is established by the third SAS device and is used to transmit frames from the third SAS device to the first SAS device. The first virtual connection and the second virtual connection may overlap operation. The first and second virtual connections utilize the same link coupling the first SAS device to the SAS expander.

Another aspect hereof provides a SAS expander adapted for coupling to at least first, second, and third SAS devices. The SAS expander includes first virtual connection logic adapted to establish and operate a first virtual connection between the first SAS device and the second SAS device for purposes of transmitting frames from the first SAS device to the second SAS device. The expander also includes second virtual connection logic adapted to establish and operate a second virtual connection between the first SAS device and the third SAS device for purposes of transmitting frames from the third SAS device to the first SAS device. The first virtual connection logic and the second virtual connection logic are each adapted to allow the first virtual connection and the second virtual connection to overlap operation.

Still another aspect hereof provides a SAS end device including first virtual connection logic adapted to establish and operate a first virtual connection between the SAS end device and a first SAS device through a SAS expander for purposes of transmitting frames from the SAS end device to the first SAS device. The SAS end device also includes second virtual connection logic adapted to establish and operate a second virtual connection between the SAS end device and a second SAS device through a SAS expander for purposes of transmitting frames from the second SAS device to the SAS end device. The first virtual connection logic and the second virtual connection logic are each adapted to allow the first virtual connection and the second virtual connection to overlap operation. The end device is adapted to establish the first and second virtual connections on the same link coupling the SAS end device to the SAS expander.

DETAILED DESCRIPTION OF THE DRAWINGS

Figure 1:
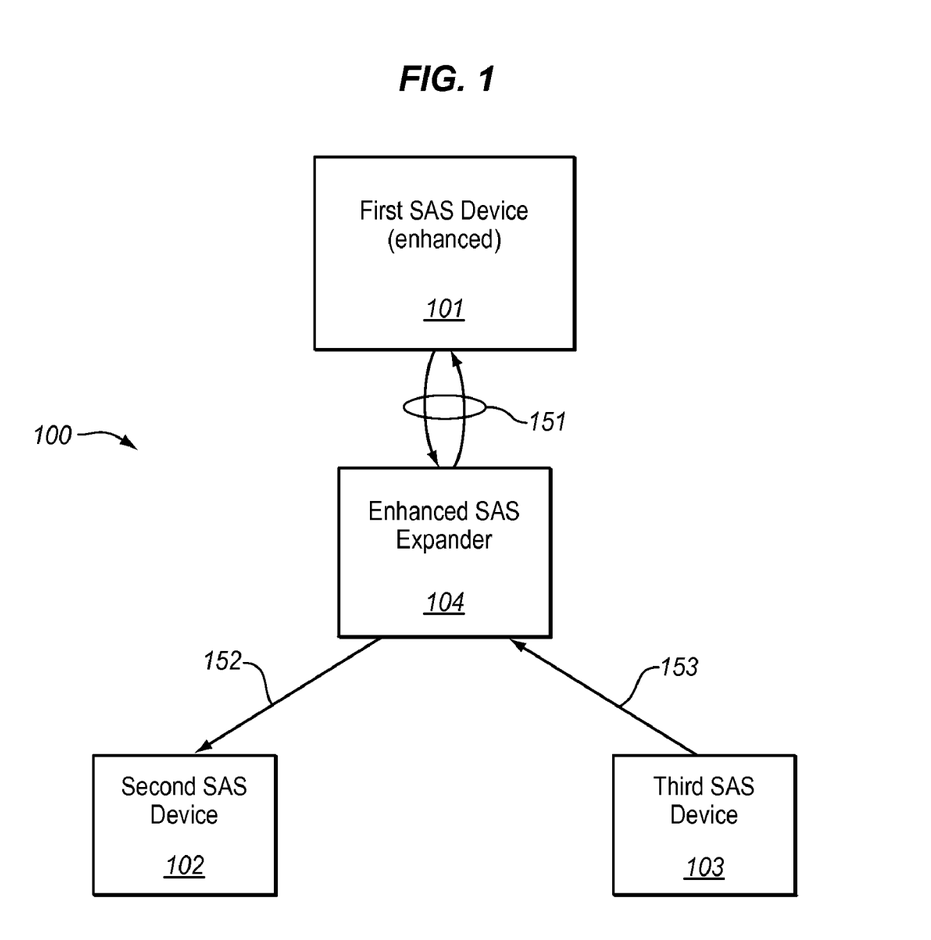
FIG. 1 is a block diagram of an exemplary system in accordance with features and aspects hereof to improve bandwidth utilization in a SAS domain.

FIG. 1 is a block diagram of an exemplary system 100 in accordance with features and aspects hereof to improve bandwidth utilization in a SAS domain. As shown in FIG. 1, the SAS domain (e.g., system 100) includes three SAS devices: a first SAS device 101, second SAS device 102, and third SAS device 103. As is well known in a SAS domain, a first SAS device 101 may connect to multiple other devices (e.g., second SAS device 102 and third SAS device 103). It is common to include one or more SAS expanders 104 to provide switchable flexibility in providing such connectivity. Those of ordinary skill in the art will readily recognize that any number of SAS devices may be interconnected via any number of associated SAS expanders in accordance with the limits of the SAS specifications and protocols. Typical SAS domains include substantially more devices and expanders than are shown in FIG. 1. Thus, FIG. 1 is simplified merely for brevity of this discussion.

In accordance with features and aspects hereof represented as system 100, first SAS device 101 and SAS expander 104 may be enhanced to permit multiple virtual connections between the first SAS device and each of second and third SAS devices 102 and 103. In particular, a first virtual connection may be established in accordance with features and aspects hereof between the first SAS device 101 and the second SAS device 102. Before, after, or substantially simultaneous with establishment of the first virtual connection, a second virtual connection may be established and utilized between the first SAS device 101 and the third SAS device 103. As noted above, prior SAS architectures and methodologies permit a full duplex connection point to point between any two SAS devices. However, prior SAS architectures and techniques did not allow a single device, through a single link connected to a SAS expander, to communicate with both of two other devices in the SAS domain substantially simultaneously.

As used herein, the simultaneity of the connections refers to any aspects of the establishment and utilization of two virtual connections. In other words, the establishment of a first virtual connection and a second virtual connection may substantially overlap to thus be performed substantially simultaneously. Or, for example, utilization of a first virtual connection, previously established, and establishment of the second virtual connection may substantially overlap to thus be performed substantially simultaneously. Or, for example, both previously established virtual connections may be utilized simultaneously by substantially overlapping data transmissions through the two virtual connections.

As further noted above, though prior SAS architectures and techniques permit a full duplex connection between a first to SAS device and a second SAS device, as a practical matter such bidirectional simultaneous communication in such a SAS connection is notably under-utilized—especially in the context of connection between a host system and a single disk drive device. That is to say only in relatively rare circumstances of disk storage applications of SAS architecture would a first SAS device and second SAS device in an established SAS connection both be desirous of transmitting any significant volume of information in both directions on the single point to point full duplex connection.

Thus, in accordance with features and aspects hereof, if the first virtual connection between the first SAS device 101 and the second SAS device 102 is established for purposes of transmitting data frames from the first SAS device to the second SAS device. The second virtual connection is established between the first SAS device 101 and the third SAS device 103 for purposes of transmitting data frames from the third SAS device 103 to the first SAS device 101—in other words in the opposite direction of frame communication relative to the first virtual connection. Therefore, in accordance with features and aspects hereof, both the first and second virtual connections are in effect unidirectional, half-duplex connections. However, as discussed above, the ability to couple a first SAS device 101 to two other SAS devices, each adapted for unidirectional exchange of information in the opposite direction from the other virtual connection, better utilizes processing and communication bandwidth of the SAS domain (e.g., system 100).

Communication path 151 represents a single logical link connecting first SAS device 101 to a particular port of SAS expander 104. In like manner, SAS expander 104 is coupled through a single logical link 152 to the second SAS device 102 and coupled through another logical link 153 to third SAS device 103. The logical connection 151 between first SAS device 101 and SAS expander 104 is better utilized by comparison with prior SAS standard full duplex link layer protocols because each direction of transmission of link 151 couples to a different SAS device. Rather, two virtual logical connections are established between the first SAS device 101 and the SAS expander 104.

Though "port", "link" and PHY are well defined by the SAS specifications, as used herein they may be considered synonymous for purposes of this discussion. In general, a link or PHY corresponds to a single physical link medium coupling two devices while a port refers to a logical construct in SAS. A single port could be, for example, a wide port that aggregates processing of multiple physical links or PHYs. Thus a port that utilizes multiple links could operate some of the multiple links in the enhanced mode in accordance with features and aspects hereof and other links in a standard, non-enhanced mode. However, for the broader purposes of this patent, the terms may be considered essentially synonymous.

In one exemplary embodiment of features and aspects hereof, first SAS device 101 may be an enhanced SAS end device such as a host system or server computing node equipped with a suitably enhanced SAS host adapter. Further, SAS expander 104 may be a SAS expander enhanced in accordance with features and aspects hereof to permit a single logical connection with the enhanced SAS device 101 to utilize the single logical link for establishing two unidirectional virtual connections to a second and third SAS device 102 and 103, respectively. The second and third SAS devices 102 and 103 may be, for example, standard SAS devices such as storage devices or other peripheral I/O devices. A first virtual connection couples the enhanced SAS device (first SAS device 101) to second SAS device 102 through logical link 151, via expander 104, and logical link 152. This first virtual connection is utilized for purposes of the enhanced SAS device 101 transmitting data frames to the storage device represented by second SAS device 102. The second virtual connection is established between the first SAS device 101 and the third SAS device 103, e.g., a second storage device desirous of transmitting information back to the enhanced SAS device 101. This second virtual connection couples the enhanced SAS device 101 and the third SAS device 103 via link 151, SAS expander 104, and link 153. Data frames generated in the third SAS device 103 are then transmitted back to the enhanced SAS device 101, e.g., read data transmitted from a storage device back to the requesting host system SAS device. Thus, the single logical link 151 coupling the enhanced SAS device to the enhanced SAS expander is more fully utilized by substantially simultaneous transmissions from the first device 101 to a second SAS device 102 (e.g., write operations to a storage device) and transmissions from the third SAS device 103 to the enhanced SAS device (e.g., return of read data responsive to another host request).

Those of ordinary skill in the art will readily recognize numerous additional features and elements within a fully functional SAS device or SAS expander. Such well-known elements are omitted from FIG. 1 simply for brevity of this discussion.

Figure 2:
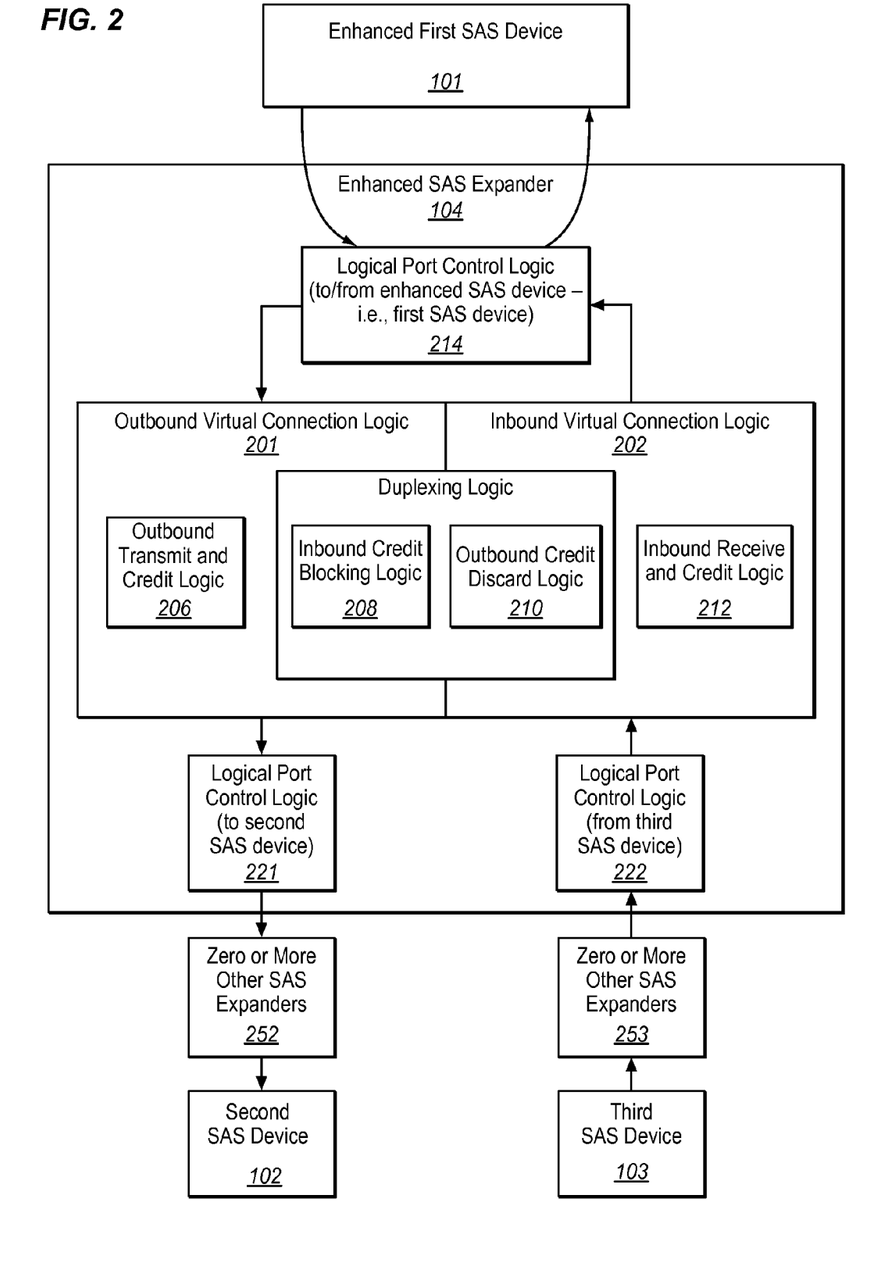
FIG. 2 is a block diagram of an exemplary first SAS device and SAS expander both enhanced in accordance with features and aspects hereof to permit multiple unidirectional virtual connections between the first device and each of two other SAS devices.

FIG. 2 is a block diagram of an exemplary enhanced SAS expander 104 enhanced in accordance with features and aspects hereof to permit multiple unidirectional virtual connections between a first SAS device 101 and each of two other SAS devices 102 and 103.

SAS expander 104, enhanced in accordance with features and aspects hereof, includes separate outbound virtual connection logic element 201 and a separate inbound virtual connection logic element 202 for enhanced mode communication with the enhanced first device 101. Outbound virtual connection logic 201 manages transport and link layer processing associated with transmitting outbound data frames to a second SAS device 102 coupled to the SAS expander 104 (directly or through one or more intervening other SAS expanders 252 in the SAS domain). Inbound virtual connection logic element 202 manages transport and link layer processing associated with receiving inbound data frames from a third SAS device 103 coupled to the SAS expander 104 (directly or also through one or more other expanders 253 in the SAS domain). Lower level logical PHY control logic 214 physically couples the enhanced SAS expander 104 to a corresponding single link of a SAS expander through which the first SAS device 101 communicates with both the second and third SAS devices.

Outbound virtual connection logic 201 includes outbound transmit and credit logic element 206 responsible for managing standard SAS protocol transport and link layer state machines for transmitting data frames from the first SAS device 101 to the second SAS device 102 in accordance with SAS credit protocols and handshakes. In like manner, inbound virtual connection logic element 202 may include inbound receive and credit logic 212 generally responsible for link and transport layer management in accordance with standard SAS state machine models when receiving inbound data frames from the attached third SAS device 103 bound for the first SAS device 101.

Duplexing logic element 203 represents combinatorial and/or sequential logic to perform specialized state machine processing associated with features and aspects hereof to prevent inbound data frame transmissions from the second SAS device 102 to the first SAS device 101 and to avoid outbound data frame transmissions to the third SAS device 103 from the first SAS device 101 (e.g., typically by simply ignoring or discarding the receive credit indications from the third SAS device). In particular, duplexing logic element 203 may include inbound credit blocking logic 208 to generate a CREDIT BLOCKED primitive for transmission to the second SAS device 102. Preferably, upon establishment of the first virtual connection with the second SAS device 102, inbound credit blocking logic element 208 immediately transmits a CREDIT BLOCKED primitive to inform the second SAS device 102 that the enhanced first SAS device 101 will not receive any data frame transmissions from the second SAS device. In like manner, duplexing logic element 203 may include outbound credit discard logic 210 generally operable to avoid outbound transmissions from the enhanced first SAS device 101 to the third SAS device 103. Avoiding such outbound transmissions may merely represent processing, for example, to ignore any RRDY primitives received from the third SAS device 103 used to indicate receive buffer space for receipt of transmissions from the first SAS device 101. Other logic within the enhanced first SAS device 101 may simply never attempt to send data frames to the third SAS device 103 based on use of the enhanced mode of operation to establish multiple unidirectional virtual connections.

As implemented within a SAS expander 104, the outbound virtual connection logic 201 and inbound virtual connection logic 202 are associated with three PHY control logic elements. PHY control logic element 214 implements PHY control for coupling the SAS expander 104 through a single link to an enhanced first SAS device 101. PHY control logic element 221 couples the outbound virtual connection logic 201 through a single link to the second SAS device 102 (e.g., a storage device or other peripheral device). PHY control logic element 222 couples inbound virtual connection logic 202 to the third SAS device 103 (e.g., another storage device adapted for and presently requiring a connection to the first SAS device for transmitting data frames thereto).

Enhanced SAS expand expander 104 is therefore adapted to establish a first virtual connection coupling the enhanced first SAS device 101 to a second SAS device 102. This first virtual connection is configured for transmitting data frames from the first SAS device 101 to the second SAS device 102—e.g., data frames transmitted from a host system SAS adapter device to a SAS storage device as in processing of write requests from a SAS host device. In operation of the first virtual connection, the enhanced SAS expander 104 receives data frames through control logic 214. The received data frames from the enhanced SAS device are forwarded through outbound virtual control logic 201 and, in association with standard routing logic within the enhanced SAS expander 104, onto PHY control logic 221 for forwarding through that logical link to the second SAS device 102.

The enhanced SAS expander 104 is also adapted to establish a second virtual connection coupling the first SAS device 101 to a third SAS device 103. This second virtual connection is configured for receiving data frames from the third SAS device for processing within the first SAS device—e.g., data frames transmitted from a SAS storage device back to a host system SAS device such as in processing of read requests. In operation of this second virtual connection, the enhanced the SAS expander 104 receives data frames through PHY control logic 222 from the third SAS device 103. These received data frames are forwarded through inbound virtual connection logic element 202 on to PHY control logic element 214 for forwarding to the enhanced first SAS device 101.

Thus, enhanced SAS expander 104 is adapted to establish two unidirectional virtual connections—the first virtual connection between the first SAS device 101 and the second SAS device 102 and the second virtual connection between the first SAS device 101 and the third SAS device 103. The first virtual connection is utilized to transmit data frames from the first SAS device to the second SAS device while the second virtual connection is utilized to transmit data frames from the third SAS device to the first SAS device.

Those of ordinary skill in the art will readily recognize a variety of different and additional elements that may be useful in a fully operational enhanced SAS expander 104. Such additional elements are omitted in FIG. 2 for simplicity and brevity of this discussion.

In an exemplary preferred embodiment, enhanced features and aspects hereof may be distributed in combinatorial and/or sequential logic added to both the enhanced SAS expander and the enhanced SAS device. The enhanced SAS device may be suitably configured to request that its connection to a SAS expander be enabled for an enhanced mode of operation. An enhanced SAS expander in accordance with features and aspects hereof responds to the request of the enhanced SAS device by granting the enhanced mode operation. A legacy SAS expander devoid of the enhanced features and aspects hereof would reject the new request from the enhanced SAS device and simply continue to operate in the standard SAS operating mode. Thus the enhanced SAS device is backward compatible to continue operating in accordance with SAS standards when not connected to a suitable enhanced SAS expander.

Figure 3:
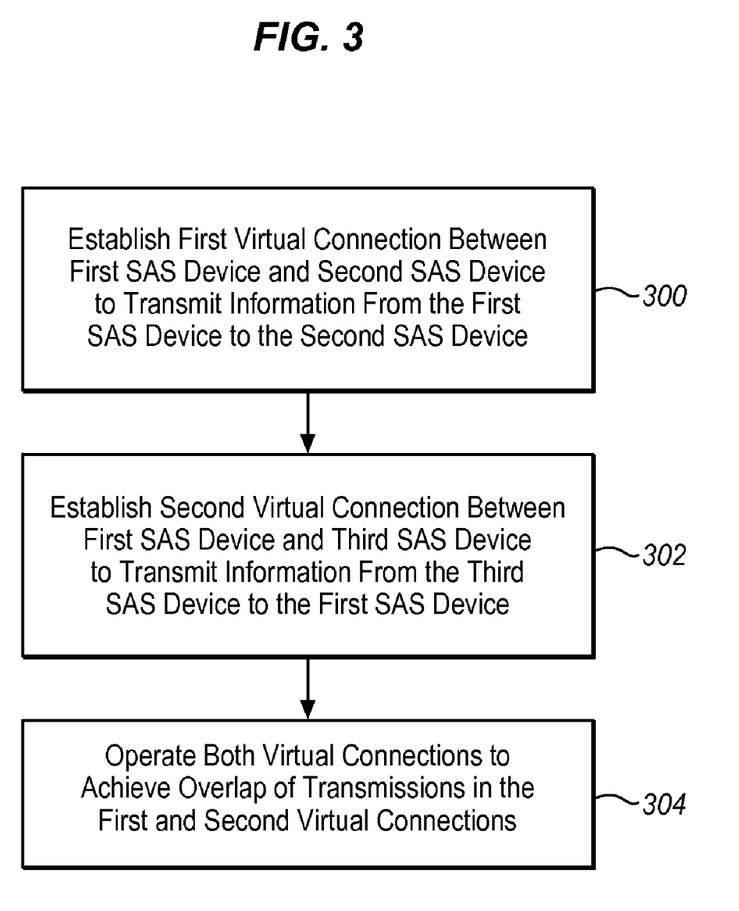
FIG. 3 is a flowchart describing an exemplary method in accordance with features and aspects hereof operable in a SAS domain system enhanced in accordance with features and aspects hereof.

FIG. 3 is a flowchart broadly describing an exemplary method in accordance with features and aspects hereof operable in a SAS domain system enhanced in accordance with features and aspects hereof. As discussed above, features and aspects hereof permit a SAS domain to establish dual, unidirectional, virtual connections between a first SAS device and both a second and third SAS device. Element 300 of FIG. 3 is therefore first operable to establish a first virtual connection between a first SAS device and a second SAS device. For example, the first SAS device may be a host system or server with an appropriate host bus adapter and the second SAS device may be a storage device such as a disc drive or other similar storage devices. This first virtual connection is used for transmitting SAS data frames from the first SAS device to the second SAS device. Such data transmissions may be in response to, for example, processing of the host system or server write request to store information on the storage device. This first virtual connection is preferably established in such a manner as to preclude data frames transmitted in the reverse direction—i.e., from the second SAS device to the first SAS device. Thus, additional bandwidth will remain available for other storage devices presently ready and waiting to send data frames to the first SAS device. Element 302 is then operable to establish a second virtual connection between the first SAS device and a third SAS device. This second virtual connection is generally used for transmitting data frames from the third SAS device back to the first SAS device. Such transmissions may be in response to, for example, processing of a host read request when the third device (e.g., a storage device) is eventually prepared to return requested data to the first SAS device (e.g., a host system or server node with an appropriate SAS host bus adapter). Since this second virtual connection with the first SAS device is used for return of data to the first SAS device, transmissions from the first device to the third device of data frames over this second virtual connection is preferably precluded. With both unidirectional virtual connections established, element 304 is then operable to operate both virtual connections in a manner to achieve substantial overlap of the transmissions in both the first and second virtual connections. In other words, the first virtual connection may be more fully utilized for transmission of information from the first SAS device to a second SAS device while the second virtual connection remains available for any third SAS device ready and able to transmit information back to the first SAS device.

Those of ordinary skill in the art will readily recognize that all the various steps in the detailed implementation of elements 300 through 304 may be overlapped—not merely the data transmission following establishment of both virtual connections. In other words, a first virtual connection may be established and commence transmissions before a need arises for establishing a second virtual connection (e.g., a need arising due to a third SAS device being ready and able to transmit information back to the first SAS device). Thus establishment of a second SAS virtual connection may overlap data frame transmissions of the already established first virtual connection and/or may overlap the lower level operations for establishing the first virtual connection. In like manner, the first virtual connection may be not yet established of may be completed and closed while a second virtual connection remains operating. Thus a first virtual connection may be established substantially overlapping the ongoing operation of the previously established second virtual connection. In other words, no particular order or sequence need be implied in the establishment of a first connection and a second connection. They may be established and utilized in essentially any useful sequence dependent upon the particular needs for data transmission in the applicable SAS domain.

Those of ordinary skill in the art will recognize numerous equivalent and additional method steps that may be included in a fully functional method in accordance with features and aspects hereof. Such additional detailed steps are omitted in FIG. 3 for simplicity and brevity of this discussion. Further, those of ordinary skill in the art will recognize that the method of FIG. 3 is intended to express broad aspects of operating a system in accordance with features and aspects hereof. Certain detailed processing for the steps of FIG. 3 may be performed exclusively within an enhanced SAS device, exclusively within an enhanced SAS expander, or may be distributed through both the enhanced SAS expanders and enhanced SAS devices of a SAS domain.

Further, those of ordinary skill in the art will recognize that certain conditions of the SAS devices, the SAS expander, the SAS domain as a whole, or certain protocol exchanges requested by one or more of the devices coupled in the enhanced mode of operation may require termination of the enhanced connection prior to a completion request or indication coordinated among the devices. For example, if a device presently involved in such an enhanced connection requires opening of an STP SAS protocol exchange, this enhanced connection may interfere with that operation. Thus, the enhanced connection may be closed or terminated by detection of such a condition in any of the devices or the expander involved in the enhanced connection.

FIG. 3 is therefore intended to express an exemplary broad method in accordance with features and aspects hereof regardless of where such processing is performed. As noted above, in an exemplary embodiment processing of the method of FIG. 3 is preferably distributed between an enhanced SAS device that requests the enhanced mode of operation on its link to a port of an enhanced SAS expander. The enhanced SAS expander and the enhanced SAS device then cooperate to perform the method of FIG. 3 to better utilize the available bandwidth of the established connection.

Figure 4:
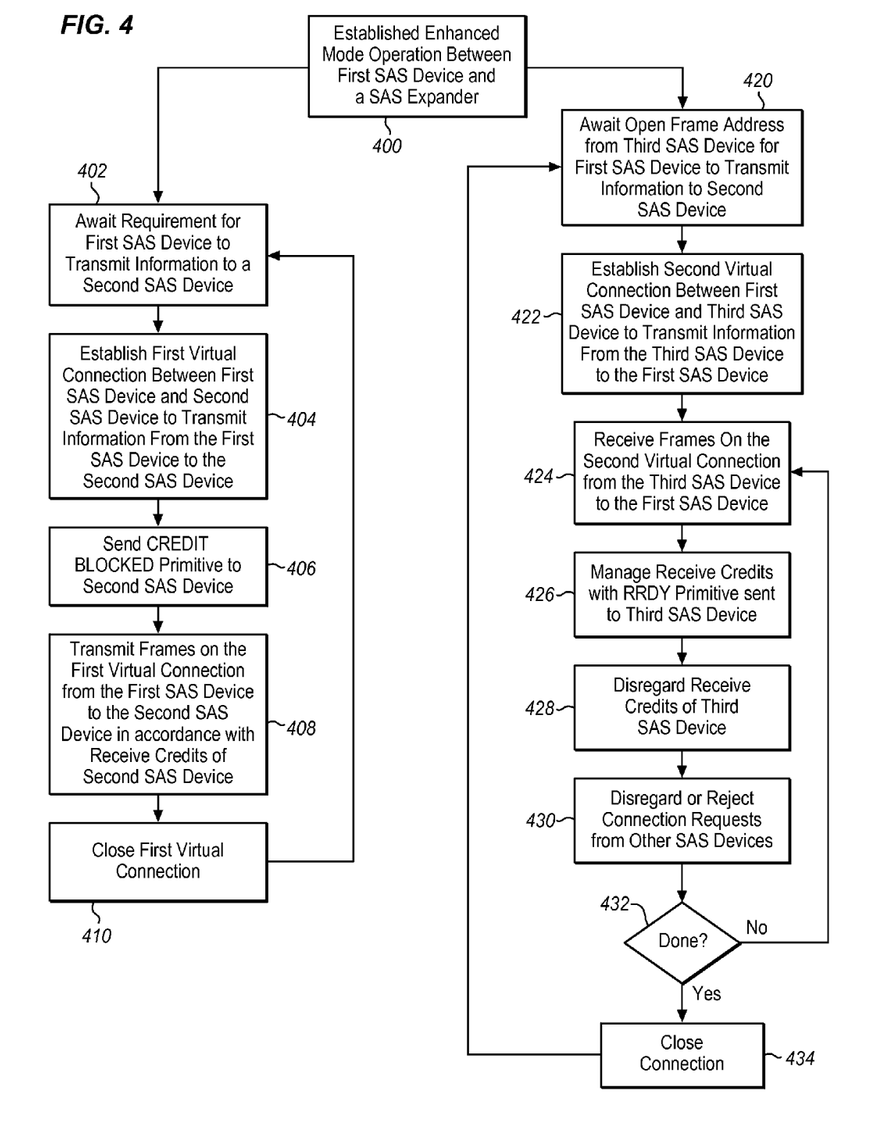
FIG. 4 is a flowchart describing an exemplary method in accordance with features and aspects hereof for establishing multiple unidirectional virtual connections among three SAS devices.

FIG. 4 is a flowchart describing an exemplary method in accordance with features and aspects hereof for establishing multiple unidirectional virtual connections among three SAS devices. Element 400 is first operable to establish an enhanced mode of operation between a first SAS device and a SAS expander. As noted above, in an exemplary preferred embodiment of features and aspects hereof, steps involved in processing the method of FIG. 4 may be cooperatively distributed between an enhanced first SAS device and an enhanced SAS expander to which the first device is coupled. It is desirable that the enhanced features and aspects hereof are implemented in a manner to remain backward compatible with existing standard SAS devices (e.g., "legacy" devices). Thus, the enhanced features and aspects hereof may preferably be enabled by an enhanced SAS device requesting that the enhanced SAS expander to which it is coupled enter an enhanced operation mode with respect to this enhanced SAS device.

A new transaction message and response may be exchanged between the first device and the expander to enable the enhanced mode. If the expander responds affirmatively, the enhanced mode processing below may commence. If the expander is not adapted to handle the enhanced mode processing (e.g., a legacy expander), it will reject the new command or message and standard, backward compatible SAS protocols will be used rather than the enhanced methods of FIGS. 3 and 4. Alternatively, the enhanced mode may be requested by special vendor unique parameters of an existing SAS transaction. In like manner, if the expander is adapted to process such an enhanced mode it will positively acknowledge the request in some manner to commence enhanced mode operations. Detailed structure and fields of such a new message or transaction between the SAS device and the SAS expander will be readily apparent to those of ordinary skill in the art as a matter of design choice.

With such an enhanced mode so enabled, processing of elements 402 through 410 may proceed iteratively substantially overlapping iterative processing of elements 420 through 434. In general, elements 402 through 410 are operable to establish and utilize a first virtual connection between the enhanced first SAS device and a second SAS device. The first SAS device is preferably coupled to a port of the SAS expander enabled for the enhanced operations enabled by operation of element 400. The second SAS device may be coupled to any other port of the SAS expander or anywhere else within the SAS domain reachable through the SAS expander to which the first device is coupled.

Element 402 awaits a requirement to establish a first virtual connection. Such a requirement arises when a first SAS device enhanced in accordance with features and aspects hereof needs to transmit information to a second SAS device. In particular, the first SAS device needs to transmit data frames to a second SAS device but the second device is unlikely to be prepared to transmit information back to the first SAS device. When such a need arises, element 404 is then operable to establish the first virtual connection between the first SAS device and second SAS device to permit transmission of data frames from the first device to the second device. As noted above, an example of such a transmission may be in response to processing of an I/O write request on a host system or server node incorporating a SAS host bus adapter device or, for example, the return of requested data from a SAS storage device to the requesting host system in response to an I/O read request. Establishment of such a connection utilizes well-known SAS primitives including, for example, an open frame address primitive and associated open accept and/or open reject primitives in response thereto. However, as noted above, this unidirectional first virtual connection is intended exclusively for data transmission from the first device to the second device. Thus, element 406 is next operable to immediately send a CREDIT BLOCKED primitive to the second SAS device to indicate that the first SAS device will not be accepting of any data frame transmissions returned from the second SAS device. Use of such a CREDIT BLOCKED primitive and associated protocols are well known to those of ordinary skill in the art as documented in the SAS specifications. Next, element 408 is operable to utilize the established first virtual connection to transmit data frames on the first virtual connection from the first SAS device to the second SAS device. Such data frame transmissions are performed in accordance with normal SAS specifications and protocols utilizing the receive credit handshake information provided by the second SAS device. When element 408 completes transmission of all data frames to be transmitted to the second device, the first virtual connection will be closed by operation of element 410 in accordance with standard SAS protocols. Processing then continues looping back to element 402 to await requirement for establishing another first virtual connection from the same first SAS device.

As noted above, elements 420 through 434 are operable substantially simultaneously with that of elements 402 through 410. Elements 420 through 434 are generally operable to establish and utilize a second unidirectional virtual connection used for transmitting information from a third SAS device back to the same first SAS device of the first virtual connection. Such operations may be performed, for example, in response to a host read request where the storage device addressed (e.g., the third SAS device) is delayed in being prepared to return requested data. Such latencies are common in, for example, rotating disk drive storage devices. Element 420 is therefore first operable to await the need for establishing such a second virtual connection. Such a second virtual connection may be deemed required when some third SAS device requests establishment of a connection with the first SAS device (e.g., to return requested read data). Upon detection of such a requirement, element 422 is next operable to establish the second virtual connection between the first device in the third SAS device to permit transmission of data frames from the third device back to the first SAS device. As with element 404 above, this unidirectional second virtual connection is intended only for transmission of data frames from the third device back to the first advice. Therefore, the first device will be operable to disregard the receive credit information received from the third SAS device and/or will simply not attempt to transmit from the first device to the third device (e.g., in the opposite direction of the unidirectional nature of this second virtual connection). Elements 424 through 432 are then iteratively operable to receive all frames ready for transmission from the third device back to the first device. Specifically, element 424 receives one or more frames over the second virtual connection transmitted from the third SAS device back to the first SAS device. Element 426 represents standard SAS specification and protocol processing to manage the transmission flow through receive credits and corresponding RRDY primitives. Element 428 represents the noted processing above within the first SAS device to disregard any received credit information associated with reception of frames on the third SAS device. Such reception on the third SAS device is not relevant to this second virtual connection intended for unidirectional operation from the first SAS device to the third SAS device. Other SAS devices may asynchronously attempt to establish their own connection to the first SAS device (e.g., when they also become a ready for return of data to the requesting first SAS device). Such further connection requests may be rejected until this second virtual connection is closed. Element 430 therefore represents such processing to disregard or reject any subsequent connection requests from other SAS devices presently in need of communicating with the first SAS device. Element 432 then determines whether additional receive frames are expected from the third SAS device. If so, processing continues looping back to element 424. Otherwise, element 434 is next operable to close the second virtual connection and continue processing looping back to element 422 await a need for reestablishing another second virtual connection with the same or another SAS device and the first SAS device. In particular, devices whose open requests were rejected or disregarded by operation of element 430 may again attempt to establish such a connection and once again resume processing of elements 420 through 434 to establish a new second virtual connection.

Those of ordinary skill in the art will recognize a variety of equivalent and additional method steps that may be useful in a fully functional system operating in accordance with the method of FIG. 4. In particular, element 400 was described above as representing processing to establish an enhanced connection mode between an enhanced first SAS device and an enhanced SAS expander in accordance with features and aspects hereof. The enhanced operating mode may also be discontinued at any time if the enhanced first device sends an appropriate directive to discontinue the enhanced operating mode. Specific commands or primitives associated with establishing and discontinuing such an enhanced operating mode will be readily apparent to those of ordinary skill in the art as a matter of design choice.

Further, as noted above, those of ordinary skill in the art will recognize that the method of FIG. 4 may be implemented as exclusively performed within an enhanced SAS device, exclusively performed within an enhanced SAS expander, or, more preferably, cooperatively distributed between an enhanced SAS device and the enhanced SAS expander to which the device is coupled. Still further, the particular, combinatorial and/or sequential logic and state machine modifications to implement the methods of FIG. 4 will be readily apparent to those of ordinary skill in the art familiar with the SAS specifications and state machines defined therein.

Figure 5:
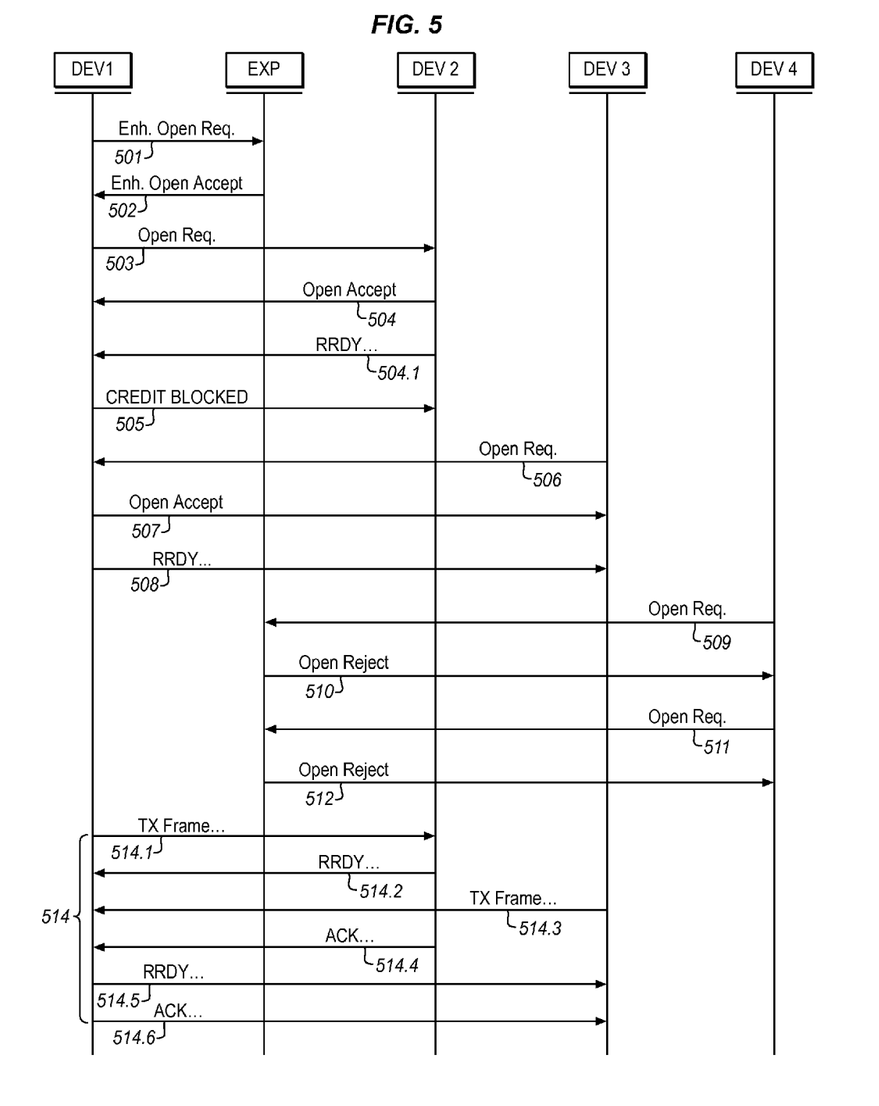
FIG. 5 is a diagram of an exemplary exchange of SAS transaction between the plurality of SAS devices and a SAS expander in accordance with features and aspects hereof.

FIG. 5 is a diagram of an exemplary exchange of SAS transaction between the plurality of SAS devices and a SAS expander in accordance with features and aspects hereof. In FIG. 5 time progresses downward in the figure. A series of directed horizontal arrows each represent a SAS message/primitive exchange transferred from a first SAS component to a receiving SAS component. The beginning of the arrow is associated with a vertical line representing the SAS component transmitting the corresponding message while the arrowed end of the directed arrow terminates at the vertical line corresponding to the receiving component of the transferred message. The message exchanges exemplified in FIG. 5 represent exchanges in a SAS domain having a first SAS device (e.g., a SAS initiator or target device) represented by the first vertical line from the left side of the figure, a SAS expander represented by the second vertical line from the left, and second, third, and forth SAS devices all coupled to corresponding ports of the same SAS expander and each representing, for example, a SAS device (e.g., a target device such as a storage device in a storage subsystem or other initiator/host devices).

Arrow 501 represents a transmission from the first SAS device (DEV1) to the SAS expander (EXP) requesting that the first SAS device and the SAS expander cooperate in allowing enhanced operation in accordance with features and aspects hereof. The particular SAS transaction (i.e., the message to be transferred from the first SAS device to the SAS expander) may be any useful message or transaction as a matter of design choice. Responsive to the message corresponding to arrow 501, arrow 502 represents a response from the SAS expander to the first SAS device indicating acceptance of the enhanced operating mode request. If the SAS expander is a legacy device that does not support the enhanced operation mode, a suitable rejection message may be returned to the first SAS device to thereby inform the first SAS device that such enhanced operations are not permitted in this particular SAS domain (through this particular SAS expander).

Having so established the enhanced operating mode between the first SAS device and the SAS expander, arrow 503 represents a standard open connection request directed from the first SAS device to the second SAS device (DEV2— via the intermediate SAS expander). This open connection request is a standard SAS request utilizing an open address frame request for the particular connection and establishes certain parameters of that connection. Responsive to acceptance of the first unidirectional virtual connection, the second SAS device may return a standard RRDY primitive to the first SAS device indicating available credit for receipt of data frames to be transmitted from the first device. In practice, multiple such RRDY primitives are forwarded from the second SAS device to the first SAS device indicating a count of the number of available buffers for storing received frames. The credit protocol utilized to control flow of messages between the first and second SAS device is well known to those of ordinary skill in the art.

In accordance with features and aspects hereof, the connection so established between the first SAS device and the second SAS device is intended for use in this enhanced mode solely for transmission of frames from the first SAS device to the second SAS device—i.e., a first unidirectional virtual connection. To help assure that the second SAS device does not attempt to return information through data frame transmissions back to the first SAS device, the first SAS device may preferably transmit a CREDIT BLOCKED primitive to the second SAS device as indicated by arrow 505. The credit blocked primitive is a standard SAS primitive used to indicate that the first device is not prepared or expecting to receive data transmission from the second SAS device.

A third SAS device (DEV3) may be asynchronously prepared to return information to the first SAS device and thus may request an open connection thereto. Arrow 506 represents such a standard SAS open connection request directed from the third SAS device to the first SAS device through the intermediate SAS expander. In accordance with the enhanced operating mode, the SAS expander will allow the open request to be passed on to the first SAS device to allow establishment of a second unidirectional virtual connection for transmission of data in the opposite direction—i.e., from the third SAS device back to the first SAS device. Arrow 507 represents a standard open accept primitive returned from the first SAS device to the third SAS device via the intermediate SAS expander. Thus, a second unidirectional connection is established between the first SAS device in the third SAS device. The second unidirectional virtual connection is used for data frame transmission back to the first SAS device while the first virtual connection established above is used for data frame transmission out of the first SAS device to the second SAS device.

By establishing dual unidirectional virtual connections with the first device, utilization of the SAS port/link coupling the first SAS device to the SAS expander may be improved over prior techniques. Whereas prior techniques would allow full duplex communication between two devices over a single logical link, it was a rare event in a SAS connection to a single disk drive storage device or even some RAID storage systems that an initiator and a target coupled in an open connection would have the need for simultaneous transmission of data frames in both directions. In accordance with features and aspects hereof, the two unidirectional virtual connections established by the messages represented as arrows 501 through 507 allow the first device to transmit frames to a second SAS device while simultaneously receiving data frames from a third SAS device.

Responsive to establishing the second unidirectional virtual connection, the first SAS device may return a standard RRDY primitive to the third SAS device indicating available credit for receipt of data frames to be transmitted from the third device. In practice, multiple such RRDY primitives are forwarded from the first SAS device to the third SAS device indicating a count of the number of available buffers for storing received frames. The credit protocol utilized to control flow of messages between the first and third SAS device is well known to those of ordinary skill in the art. Enhanced features and aspects hereof merely separate the credit management logic for each of the two unidirectional virtual connections but otherwise utilize essentially identical state machine logic for credit management protocol as described in the SAS specifications well known to those of ordinary skill in the art.

At any time while the second unidirectional virtual connection is established, yet another device may become ready to transmit data back to the first SAS device. Arrow 509 represents such an open connection request from a fourth SAS device (DEV4) directed back toward the first SAS device. The enhanced features of the SAS expander intercept the open request and return an open reject SAS primitive knowing that the second virtual connection is presently established. In accordance with normal SAS protocol processing, the fourth SAS device may repeat the open request until such time as the request is accepted or a timeout or retry count is exceeded. Thus, arrow 511 and 512 represent a repetition of the attempt to establish an open connection between the fourth SAS device in the first SAS device and a second rejection thereof in view of the presently established second virtual connection. Those of ordinary skill in the art will readily recognize that the particular number of retries attempted by the fourth SAS device or the duration of a timeout value associated with attempting to establish such a new connection are matters of design choice for a particular SAS domain and application. In an alternative embodiment, rather than rejecting the open connection request, the enhanced SAS expander may return AIP primitives to the fourth device to in effect "stall" the open request until the present virtual connection is terminated. Such AIP primitives are known in the SAS protocols to indicate that a requested connection is presently busy. Thus, in accordance with known SAS protocols, the fourth device may stall until the present virtual connection is terminated. The "stalled" open request of the fourth device may then be forwarded to the first SAS device to establish another second virtual connection.

The group of related arrows (514.1 through 514.6) identified collectively as 514 are intended to represent the substantial overlap of exchanges over the first virtual connection and the second virtual connection. As noted above, the first virtual connection is used to transmit data frames from the first SAS device to the second SAS device while the second virtual connection is utilized for transmission of data frames from the third SAS device back to the same first SAS device. Arrow 514.1 represents one or more data frame transmissions from the first SAS device to the second SAS device utilizing the first virtual connection. In response thereto arrow 514.2 represents one or more RRDY primitives returned from the second SAS device to the first SAS device using the first virtual connection as the transmitted frames are buffered and eventually consumed within the second SAS device. Arrow 514.3 represents transmission of one or more data frames from the third SAS device back to the first SAS device using the second virtual connection. Arrow 514.4 represents the eventual return of an ACK primitive from the second device to the first SAS device using the first virtual connection. Arrows 514.5 and 514.6 represent eventual return of RRDY and ACK primitives from the first SAS device to the third SAS device using the second virtual connection. Thus FIG. 5 exemplifies the substantial overlap of messages exchanged among three SAS devices (SAS device one, SAS device two, and SAS device three) utilizing two simultaneously open virtual connections.

The grouping of the messages represented as 514 represents the substantial overlap in the transmission of data frames in both directions (e.g., 514.1 and 514.3), the transmission of RRDY and ACK primitives in response to receipt of transmitted frames (e.g., 514.2, 514.4, 514.5, and 514.6), etc. Those of ordinary skill in the art will readily recognize that the various messages exchanged over the two virtual connections may be substantially, if not completely, overlapped with one another. Messages exchanged over any single one of the virtual connections are exchanged in appropriate order and sequence in accordance with SAS protocols. In other words, the transmission of frames over the first virtual connection (514.1) must necessarily precede the corresponding RRDY and ACK primitives (514.2 and 514.4) returned from the second SAS device to the first SAS device using the first virtual connection. In like manner, the transmitted data frames on the second virtual connection from the third SAS device back to the first SAS device (514.3) must necessarily precede the corresponding RRDY and ACK primitives (514.5 and 514.6) returned from the first SAS device to the third SAS device using the second virtual connection. However the various transactions on the first virtual connection (514.1, 514.2 and 514.4) may substantially overlap the transactions on the second virtual connection (514.3, 514.5, and 514.6).

Those of ordinary skill in the art will readily recognize numerous additional or alternative SAS messages and transactions that may be exchanged among the various devices. Such additional messages are eliminated from FIG. 5 for simplicity and brevity of this discussion. Thus, FIG. 5 is intended merely as exemplary of some simplified message exchanges that may overlap among the various SAS devices in accordance with features and aspects hereof. In particular, and open, established virtual connection may be closed by operation of either device associated with the established connection. For example, when the second virtual connection is closed by operation of either the first SAS device or the third SAS device, another SAS device (e.g., the fourth SAS device) may reestablish the second virtual connection coupling the fourth SAS device to the first SAS device for purposes of transmitting data frames from the fourth device to the first. Still further, additional enhanced messages may be exchanged between the first SAS device and the SAS expander to terminate the enhanced operation mode. The enhanced operation mode may be terminated for any number of reasons determined by the first SAS device and/or by the SAS expander each enhanced in accordance with features and aspects hereof. When the enhanced operation mode is so terminated, all transactions between all devices suggested by FIG. 5 will operate in accordance with standard, existing SAS protocols and specifications.

Still further, those of ordinary skill in the art will readily recognize that no specific order is required as to establishment of the first and second virtual connections. In other words, the first virtual connection may be established by the third SAS device desiring to return data frames to the first SAS device. Following establishment of that connection, a second virtual connection may be established between the first and second SAS devices for purposes of transmitting data frames from the first to the second SAS device.

Figure 6:
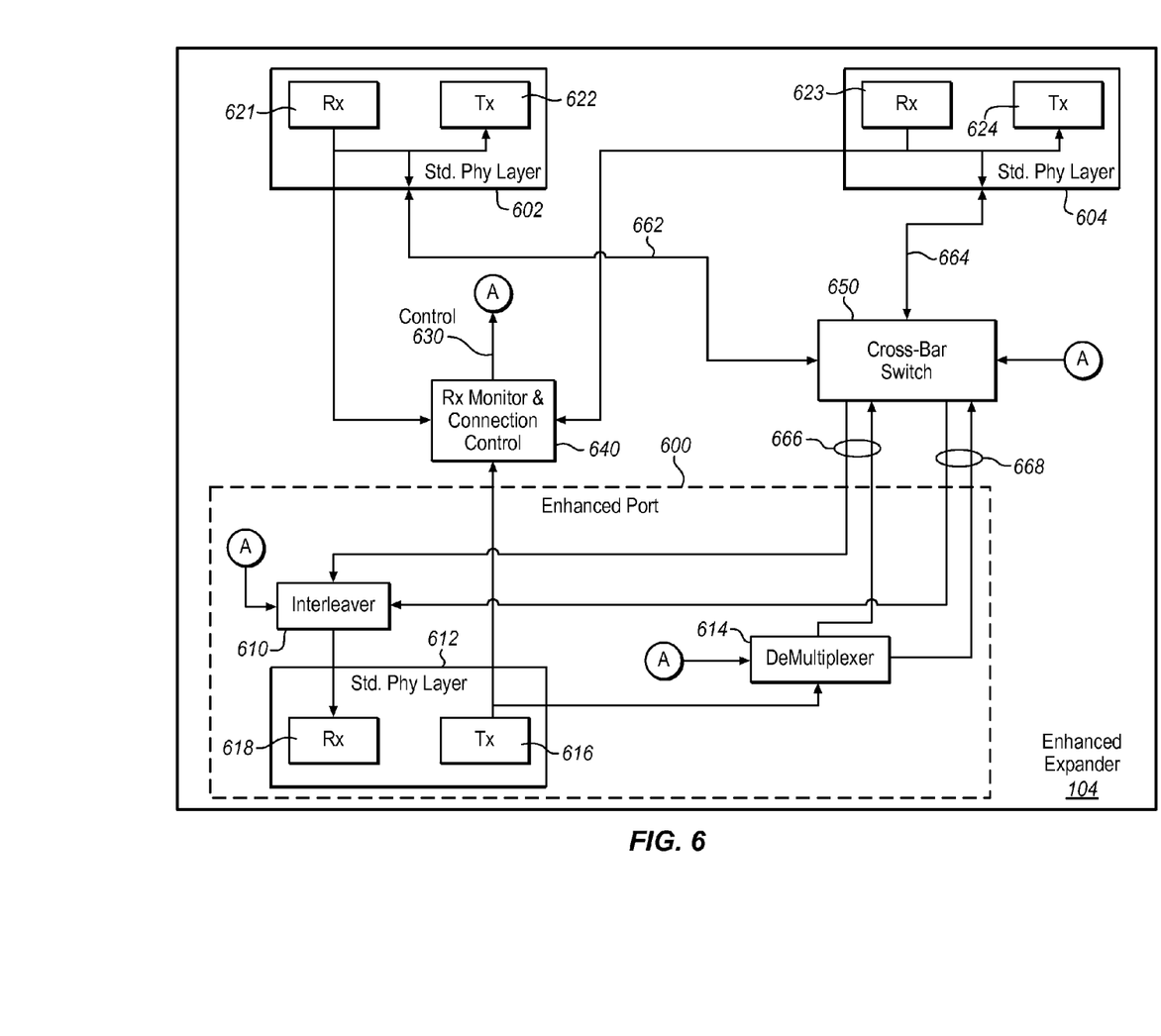
FIG. 6 is a block diagram of an exemplary embodiment of an enhanced expander in accordance with features and aspects hereof.

FIG. 6 is a block diagram of an exemplary embodiment of an enhanced SAS expander enhanced in accordance with features and aspects hereof to provide connectivity between an enhanced first SAS device and two other SAS devices to permit substantially overlapping communications between the first device and each of the other SAS devices.

FIG. 6 shows functional elements of a simplified, exemplary enhanced SAS expander 104 having two standard PHY layers 602 and 604. Each standard PHY layer 602 and 604 includes receive logic 621 and 623, respectively, and includes transmit logic 622 and 624, respectively, for receiving and transmitting SAS information with corresponding attached SAS devices.

Enhanced SAS expander 104 also includes an enhanced port/link 600 for coupling to an enhanced SAS device (i.e., a first device—not shown). Enhanced port/link 600 includes standard PHY layer 612 with its respective receive logic 616 and transmit logic 618 for receiving and transmitting SAS information to an attached enhanced first SAS device. Enhanced port/link 600 also includes interleaver 610 and demultiplexer 614 for coordinating simultaneous connections between a first device coupled to the enhanced port/link 600 and a second SAS device coupled to standard PHY layer 602 and between the first SAS device and a third SAS device coupled to standard PHY layer 604. Enhanced SAS expander also includes RX monitor and connection control logic 640 and cross-bar switch 650 for the coordination of the simultaneous virtual connections.

If control logic 640 detects that the enhanced mode of operation is not in use (i.e., no enhanced mode command and/or virtual connection requests have been made), signals applied to control bus 630 disable enhanced processing by interleaver 610 and demultiplexer 614 and simply configure cross-bar switch 650 for normal operation—i.e., normal operation of a full duplex, point to point connection between two devices. In other words, the enhanced SAS expander 104 is operable to configure the enhanced port/link 600 for use as any standard SAS port.

In enhanced mode operation (i.e., upon detection of a command or ordered set requesting enhanced mode operation), control logic 640 monitors SAS ordered sets exchanged on the receive logic of all three ports (616, 621, and 623) and applies control signals (label "A") on control bus 630 to control interleaver 610, demultiplexer 614, and cross-bar switch 650. Control logic 640 monitors ordered sets received from any of the three ports to configure cross-bar switch 650 for establishing and terminating simultaneous first and second virtual connections—e.g., a first virtual connection between the first device and the second device and a second virtual connection between the first device and the third device. Any of the devices may close or terminate its virtual connection with the other device.

During operation of the first and second virtual connections (i.e., in enhanced mode with at least one virtual connection established), control logic 640 controls operation of demultiplexer 614 and interleaver 610 of enhanced port 600 to coordinate the simultaneous use of both virtual connections by directing ordered sets from one device to the appropriate other device of the corresponding virtual connection. This coordination may also entail buffering and/or queuing of ordered sets so as to ensure that ordered sets are not lost in the virtual connections and to assure that critical ordered sets are delivered to the appropriate device and where necessary in the proper order.

For example, presume a first virtual connection is established between the first device (coupled to enhanced port 600) and the second device (coupled to standard PHY logic 602) for data transmission from the first device to the second device. Further by way of example presume a second virtual connection between the first device and the third device (coupled to standard PHY logic 604) for transmission of data from the third device to the first device.

In this exemplary first virtual connection, data ordered set transmissions will generally dominate the exchanges from the first device (on enhanced port 600) to the second device (on standard PHY 602). Such data ordered sets will generally flow from the receive logic 616 of the enhanced port 600 to the transmit logic 622 of standard PHY 602 through demultiplexer 614 and switch 650 and over paths 668 and 662. In like manner data ordered set transmissions will generally dominate the exchanges from the third device (on standard PHY 604) to the first device (on enhanced port 600). Such data ordered sets will generally flow from the receive logic 623 of standard PHY layer 604 through the switch 650 and interleaver 610 to the transmit logic 618 of enhanced port 600 over paths 666 and 664.

Though data ordered sets may dominate transmissions coming into interleaver 610 for application to transmit logic 618 from receive logic 623, ordered sets from receive logic 621 may also be received such as for protocol handshakes, opening and closing a connection, flow control, etc. In like manner, though data ordered sets from receive logic 616 to transmit logic 622 dominate the transmission through demultiplexer 614, occasionally ordered sets will from receive logic 616 will be directed through demultiplexer 614 to transmit logic 624 such as for protocol handshakes, opening and closing a connection, flow control, etc. Thus demultiplexer 614 is adapted to receive ordered sets from receive logic 616 of enhanced port 600 and to apply the received ordered sets through switch 650 via path 666 to standard PHY layer 602 or via path 668 to standard PHY layer 604. Control logic 640 coordinates the selection of the path and configures switch 650 appropriately. Further, interleaver 610 is adapted to receive ordered sets from either receive logic 621 via paths 662 and 666 or receive logic 623 via paths 664 and 668 and apply the received ordered sets to transmit logic 618. Interleaver 610 coordinates this communication in conjunction with control signals 630 generated by control logic 640 to configure switch 650.

Demultiplexer 614 generally comprises combinatorial and/or sequential logic that may implement, for example, a state machine to coordinate with receive logic 616 the transmission of data sets to transmit logic 622 or transmit logic 624 (in further coordination with control logic 640 configuring of switch 650).

Interleaver 610 generally comprises combinatorial and/or sequential logic operable to interleave received ordered sets from either receive logic 621 or receive logic 623 for application to transmit logic 618. The interleaving (in cooperation with the monitoring features of control logic 640) may detect when an idle period is available in the predominant transmission of data frames from receive logic 623. Until such an idle period is detected, ordered frames received from receive logic 621 for application to transmit logic 618 may be buffered/queued for later application. When the control logic 640 and interleaver 610 eventually identify an idle period, the buffered/queued ordered sets (if any) may be forwarded from the queue to the first device through transmit logic 618.

The functional elements of the enhanced SAS expander 104 shown in FIG. 6 represent one exemplary possible decomposition of functions performed therein. Those of ordinary skill in the art will readily recognize numerous similar and equivalent functional decompositions of features and aspects hereof in an enhanced SAS expander. In particular, detailed design and implementation of the logic features discussed above will be readily apparent to those of ordinary skill in the art as a matter of design choice. In addition, those of ordinary skill in the art will readily recognize extensions to the functional elements described above in FIG. 6 to scale the enhanced expander 104 to provide multiple such enhanced ports 600 and to permit all such ports to be coupled to one another to establish multiple virtual connections therebetween. Thus FIG. 6 is intended merely as exemplary of one possible embodiment of features and aspects hereof.

As noted above, the interleaver of the enhanced expander may include buffering and/or queuing logic to temporarily save one or more received ordered sets sent from the second to the first device until such time as they may be interleaved with other ordered set transmission from the third to the first device. Any well known buffer/queuing structures may be employed for this function within the enhanced SAS expander.

Below is a discussion of exemplary, common, ordered sets of the SAS protocol and brief description of exemplary processing of an interleaver to coordinate the interleaving of those ordered frames received from either the second or third device for application over enhanced port to the first device while the other of the second or third device is presently transmitting ordered frames to the first device. Those of ordinary skill in the art will readily recognize that the particular exemplary processing is not intended to express required processing for a particular ordered set. Rather, the exemplary processing is intended merely as typical processing that may or may not be useful in interleaving ordered sets received from two other devices for application to an enhanced device to maintain communications on each of two virtual connections. The particular processing useful in a particular application of features and aspects hereof will be readily ascertained by those of ordinary skill in the art. For example, some ordered sets may require queuing by the interleaver while other ordered sets may simply be discarded without loss of integrity of the virtual connection or of the data transferred over the virtual connection. Further, some queued ordered sets may be best forwarded to the enhanced device while maintaining the order in which the ordered sets were received on the corresponding virtual connection. Such design details will be readily apparent as a matter of design choice.

ACK, NAK, CREDIT_BLOCKED, and RRDY ordered sets are expected in response to transmissions from the first device to the second device in the first virtual connection as part of the standard SAS handshake protocols and must be forwarded to the first device when the other (second) virtual connection becomes idle. Since multiple such ordered sets (other than CREDIT_BLOCKED) may be received in relatively rapid succession between idle periods of the second virtual connection, the same number must be queued and forwarded to the first device interleaved into idle periods of the second virtual connection. A queued CREDIT_BLOCKED should be forwarded before any queued CLOSE but queued ACK, NAK, or RRDY ordered sets may be sent in any order relative to other queued ordered sets (if any). Any queued ACK, NAK, RRDY, or CREDIT_BLOCKED may be flushed from the queue if the connection is closed by any mechanism.

DATA, SOF, EOF, SOAF, EOAF and HARD_RESET ordered sets may be received indicative of data frame transmissions, address frame transmissions and reset requests from a remote port. These ordered sets need not be queued per se but rather are interleaved for forwarding back to the first device at a heightened priority.

AIP, ERROR, and SATA related ordered sets are not generally expected to be received by the interleaver from the second or third for forwarding to the first device. No buffering or queuing of such ordered sets is therefore required of the interleaver. The ordered set may be forwarded to the first device if the other virtual connection is presently idle transmitting to the first device or may simply be discarded. The ERROR ordered set could optionally be queued to provide more detailed information back to the first device regarding the error in an earlier transmission. SATA related ordered sets would not be expected and in fact SATA connections would likely be precluded while the enhanced mode of operation is enabled.

OPEN_ACCEPT, OPEN_REJECT, DONE, CLOSE, and BREAK ordered sets are generally used to establish/reject and control opened connections and must be queued and forwarded to the first device when the second virtual connection becomes idle. In general, only one of these ordered sets is received at a time and thus there is typically no need to queue more than one such ordered set for forwarding. A queued BREAK should generally be forwarded before a queued DONE or CLOSE ordered set. A queued CLOSE should normally be forwarded after any queued DONE or BREAK ordered sets. A queued OPEN_ACCEPT should be forwarded before any associated queued RRDY ordered sets but a queued OPEN_REJECT need not be forwarded in any particular order relative to other queued ordered sets (if any). A queued DON should be forwarded before any queued CLOSE ordered set but after any queued BREAK ordered set. Any queued BREAK, OPEN_ACCEPT, OPEN_REJECT, or CLOSE may be flushed from the queue if the connection is closed by any mechanism.

ALIGN ordered sets may be received but need not be queued or buffered. As with the AIP above, an ALIGN ordered set may be forwarded to the first device if the other virtual connection is presently idle transmitting to the first device.

BROADCAST ordered sets may be received any time over a virtual connection and must be forwarded to the first device and thus must be queued for later transmission when the other virtual connection becomes idle. Normal processing within a SAS expander already provides for such queuing of BROADCAST ordered sets and thus similar queuing may be utilized to queue the BROADCAST and to later forward the queued ordered set to the first device. A queued BROADCAST typically does not require forwarding in any particular order relative to any other queued ordered sets.

NOTIFY ordered sets are often sent by a device to indicate its readiness for further processing (e.g., spin up of a disk drive, etc.). In accordance with the SAS protocols, they may be sent periodically in groups of four and may also be replaced by an ALIGN ordered set. If this ordered set is queued when a connection is to be closed, the queued NOTIFY (or ALIGN) should be sent before the connection is closed. Any queued NOTIFY may be flushed from the queue if the connection is closed by any mechanism.

Those of ordinary skill in the art will recognize any of a variety of queuing structures and methods that may be used for such a queue structure. For example, a simple bit array may be provided where each bit represents one type of ordered set that may be present or not present in the queue if the corresponding bit is set or reset. For those ordered sets that may have multiple queued entries, a corresponding counter may be provided. In the alternative, a more typical queue structure with a list of entries in a push down list or a linked list structure may be provided with each entry corresponding to one ordered set to be forwarded. Such design choices will be readily apparent to those of ordinary skill in the art.

Further, those of ordinary skill will readily recognize logic that may be implemented to sense when the other virtual connection has become idle. The SAS specification provides numerous states in the sample state machine models in which a particular connection is known to be idle. Such an idle period may be used by the other virtual connection (through the interleaver of the enhanced port) to forward queued ordered sets back to the first device. Thus specific details of the design of combinatorial and/or sequential logic to implement features and aspects described herein as the control logic, the interleaver, and/or the demultiplexer of an enhanced port will be readily apparent to those of ordinary skill in the art as matters of design choice.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A system comprising:
   three serial attached SCSI (SAS) devices including a first SAS device, a second SAS device and a third SAS device; and
   a SAS expander component configured to couple the first SAS device to each of the second SAS device and the third SAS device,
   wherein the first SAS device and the SAS expander are adapted to simultaneously allow and operate a first open connection between the first and second SAS devices and a second open connection between the first and third SAS devices, and
   wherein the first and second open connections utilize a single physical link (PHY) coupling the first SAS device to the SAS expander.

2. The system of claim 1
   wherein the first open connection is used to transmit frames from the first SAS device to the second SAS device, and
   wherein the second open connection is used to transmit frames from the third SAS device to the first SAS device.

3. The system of claim 2
   wherein the system is adapted to block receive credit associated with the first SAS device in the first open connection by sending a CREDIT BLOCKED primitive from the first SAS device to the second SAS device.

4. The system of claim 2
   wherein the system is adapted to disregard RRDY primitives in the second open connection normally sent by the third SAS device to the first SAS device.

5. The system of claim 1
   wherein the SAS expander is adapted to reject an open address frame from a fourth SAS device directed to the first SAS device while the second open connection remains open.

6. The system of claim 1
wherein the SAS expander is adapted to delay an open address frame from a fourth SAS device directed to the first SAS device while the second open connection remains open.

7. A method operable in a serial attached SCSI (SAS) domain having a SAS expander coupling a first SAS device to each of second and third SAS devices, the method comprising:
establishing a first virtual connection between the first SAS device and the second SAS device through the SAS expander wherein the first virtual connection is established by the first SAS device and is used to transmit frames from the first SAS device to the second SAS device; and
establishing a second virtual connection between the first SAS device and the third SAS device through the SAS expander wherein the second virtual connection is established by the third SAS device and is used to transmit frames from the third SAS device to the first SAS device,
wherein the first virtual connection and the second virtual connection may overlap operation, and
wherein the first and second virtual connections utilize the same physical link (PHY) coupling the first SAS device to the SAS expander.

8. The method of claim 7 further comprising:
rejecting an open address frame from a fourth SAS device directed to the first SAS device while the second virtual connection remains open.

9. The method of claim 7 further comprising:
disregarding RRDY primitives sent by the third SAS device to the first SAS device.

10. The method of claim 7 further comprising:
sending a CREDIT BLOCKED primitive from the first SAS device to the second SAS device.

11. A serial attached SCSI (SAS) expander adapted for coupling to first, second, and third SAS devices wherein the SAS expander further comprises:
first virtual connection logic adapted to establish and operate a first virtual connection between the first SAS device and the second SAS device for purposes of transmitting frames from the first SAS device to the second SAS device; and
second virtual connection logic adapted to establish and operate a second virtual connection between the first SAS device and the third SAS device for purposes of transmitting frames from the third SAS device to the first SAS device,
wherein the first virtual connection logic and the second virtual connection logic are each adapted to allow the first virtual connection and the second virtual connection to overlap operation utilizing a single physical link (PHY) coupling the SAS expander with the first SAS device.

12. The expander of claim 11 further comprising:
open connection rejection logic adapted to reject an open frame request from a fourth SAS device directed to the first SAS device while the second virtual connection remains open.

13. The expander of claim 11
wherein the second virtual connection logic further comprises:
duplex logic adapted to disregard RRDY primitives directed from the third SAS device to the first SAS device.

14. The expander of claim 11
wherein the first virtual connection logic further comprises:
duplex logic adapted to block receive credit associated with the first SAS device in the first open connection by sending a CREDIT BLOCKED primitive from the first SAS device to the second SAS device.

15. The expander of claim 11
wherein the second virtual connection logic is adapted to reject an open address frame from a fourth SAS device directed to the first SAS device while the second open connection remains open.

16. The expander of claim 11
wherein the second virtual connection logic is adapted to delay an open address frame from a fourth SAS device directed to the first SAS device while the second open connection remains open.

17. A serial attached SCSI (SAS) end device comprising:
first virtual connection logic adapted to establish and operate a first virtual connection between the SAS end device and a first SAS device through a SAS expander for purposes of transmitting frames from the SAS end device to the first SAS device; and
second virtual connection logic adapted to establish and operate a second virtual connection between the SAS end device and a second SAS device through a SAS expander for purposes of transmitting frames from the second SAS device to the SAS end device,
wherein the first virtual connection logic and the second virtual connection logic are each adapted to allow the first virtual connection and the second virtual connection to overlap operation, and
wherein the end device is adapted to establish the first and second virtual connections on the same physical link (PHY) coupling the SAS end device to the SAS expander.

18. The end device of claim 17
wherein the second virtual connection logic further comprises:
duplex logic adapted to disregard RRDY primitives directed from the second SAS device to the SAS end device.

19. The end device of claim 17
wherein the first virtual connection logic further comprises:
duplex logic adapted to block receive credit associated with the first SAS device in the first open connection by sending a CREDIT BLOCKED primitive from the SAS end device to the first SAS device.

20. The end device of claim 17 further comprising:
duplex logic adapted to manage transmission credit associated with the first virtual connection independent of the reception credit associated with the second virtual connection.

* * * * *